US008396596B2

(12) United States Patent
Oka et al.

(10) Patent No.: US 8,396,596 B2
(45) Date of Patent: Mar. 12, 2013

(54) ROBOT WITH LOAD SENSOR

(75) Inventors: Takenori Oka, Kitakyushu (JP); Manabu Okahisa, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 314 days.

(21) Appl. No.: 12/832,018

(22) Filed: Jul. 7, 2010

(65) Prior Publication Data

US 2011/0010011 A1 Jan. 13, 2011

(30) Foreign Application Priority Data

Jul. 8, 2009 (JP) ................................ 2009-161513

(51) Int. Cl.
*G05B 15/00* (2006.01)
*B25J 9/06* (2006.01)
*B25J 13/08* (2006.01)

(52) U.S. Cl. .... 700/258; 901/34; 74/490.01; 74/490.02; 74/490.03

(58) Field of Classification Search .................. 700/258; 901/34; 74/490.01–490.06
See application file for complete search history.

(56) References Cited

U.S. PATENT DOCUMENTS 4,621,332 A * 11/1986 Sugimoto et al. ............ 700/260
5,513,536 A * 5/1996 Reger et al. .............. 73/862.191
5,581,166 A * 12/1996 Eismann et al. ......... 318/568.22
6,125,715 A * 10/2000 Nissfolk et al. ............ 74/490.02
2005/0103148 A1* 5/2005 Inoue et al. ................ 74/490.02
2007/0151391 A1* 7/2007 Larkin et al. ............... 74/490.06
2008/0312769 A1 12/2008 Sato et al.
2009/0088899 A1 4/2009 Johansson et al.
2009/0114052 A1 5/2009 Haniya et al.

FOREIGN PATENT DOCUMENTS

CN 101272886 9/2008
CN 101277794 10/2008
JP 2001-038673 2/2001
JP 2008-307634 12/2008

OTHER PUBLICATIONS

Djordjevich et al., "Curvisensors for inside and outside robot arms", Instrumentation and Measurement Technology Conference, vol. 1, May 1994, pp. 171-174.*
Chinese Office Action for corresponding CN Application No. 201010220201.4, Sep. 28, 2011.

* cited by examiner

*Primary Examiner* — James Trammell
*Assistant Examiner* — Todd Melton
(74) *Attorney, Agent, or Firm* — Ditthavong Mori & Steiner, P.C.

(57) ABSTRACT

A robot includes an arm including a plurality of joints, arm members that form the arm, each arm member supporting a load, actuators that drive the joints and that are supported by the arm members, a load sensor embedded in at least one of the arm members to measure the load applied to the at least one of the arm members, a controller that controls movements of the actuators on the basis of a result of the measurement performed by the load sensor, and a wire hole through which a sensor line extend from a space inside the at least one of the arm members to a space inside the arm, the sensor line connecting the load sensor to the controller.

18 Claims, 3 Drawing Sheets

ROBOT WITH LOAD SENSOR

CROSS-REFERENCE TO RELATED APPLICATION

The present application claims priority to under 35 U.S.C. §119 Japanese Patent Application No. 2009-161513, filed Jul. 8, 2009. The contents of this application are incorporated herein by reference in their entirety.

BACKGROUND OF THE INVENTION

1. Field of the Invention

The present invention relates to a robot having a force control function.

2. Description of the Related Art

Operations for assembling industrial products, such as automobiles and home appliances, have been performed manually, and automation of such an operation has been demanded. The operations that are generally manually performed include an operation of fitting a plurality of components to each other, a force-following operation (for example, an operation of pressing a component against another component at a certain force), etc., which require relatively delicate movements. In the case where a robot is caused to perform such operations in place of a human worker, it is necessary to accurately control a force (hereinafter referred to as an external force) applied by the robot to the components (workpieces) handled by the robot.

Japanese Patent No. 3383614 (Japanese Unexamined Patent Application Publication No. 2001-38673) discloses an example of a method for controlling a force applied by a robot. In this method, a contact sensor, such as a pressure-sensitive sensor, is attached to a surface of an arm of a robot. The external force applied to the arm is measured by the sensor, and a driving unit (actuator) of each joint of the robot is controlled on the basis of the result of the measurement. In addition, Japanese Unexamined Patent Application Publication No. 2008-307634 discloses a technique in which a six-axis force sensor is attached to a wrist of a robot. A force and a moment applied to a workpiece at a hand of the robot are determined, and a drive amount of each driving unit is controlled on the basis of the determined force and moment.

SUMMARY OF THE INVENTION

According to one aspect of the present invention, a robot includes an arm including a plurality of joints; arm members that form the arm, each arm member supporting a load; actuators that drive the joints and that are supported by the arm members; a load sensor embedded in at least one of the arm members to measure the load applied to the at least one of the arm members; a controller that controls movements of the actuators on the basis of a result of the measurement performed by the load sensor; and a wire hole through which a sensor line extends from a space inside the at least one of the arm members to a space inside the arm, the sensor line connecting the load sensor to the controller.

BRIEF DESCRIPTION OF THE DRAWINGS

The present invention will be described in further detail with reference to the accompanying drawings wherein.

DETAILED DESCRIPTION OF THE EMBODIMENTS

An embodiment of the present invention will be described with reference to the drawings.

Figure 2:
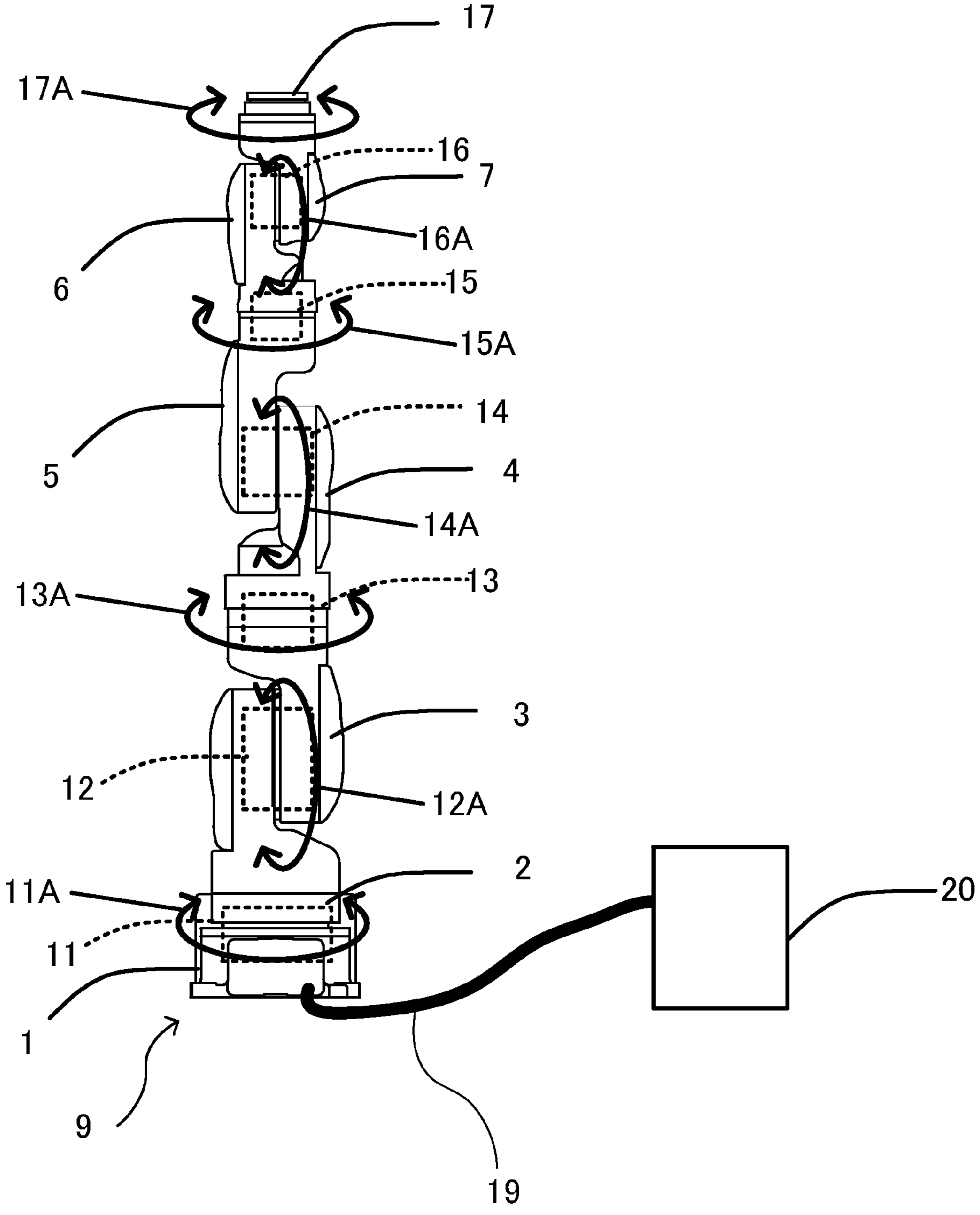
FIG. 2 is a schematic front view of the robot.

As illustrated in FIG. 2, a robot (arm) 9 according to the present embodiment includes a base 1, arm members 2 to 7, a flange portion 8, actuators (joints) 11 to 17, and a controller 20. An articulated arm is formed by the base 1, the arm members 2 to 7, and the actuators (joints) 11 to 17.

The base 1 is fixed to the floor (or to a fixed plane, such as the ceiling) with anchor bolts (not shown).

The arm members 2 to 7 are structural support members supporting a load of robot 9 and what robot 9 is holding formed of a cast metal or the like, and are arranged in series in that order from the base 1.

The actuator (joint) 11 is interposed between the base 1 and the arm member 2 and is capable of rotating the base 1 and the arm member 2 in the directions shown by the arrow 11A. The actuators 12 to 16 are disposed at the connecting sections between the arm members 2 to 7. The actuator 17 is mounted in the arm member 7 at a distal end thereof.

Each of the actuators 11 to 17 includes a servo motor, reduction gears, and a brake, and the operation of each of the actuators 11 to 17 is controlled in accordance with a signal from a controller 20.

More specifically, the arm member 2 and the arm members 3 to 7 supported by the arm member 2 can be turned in the directions shown by the arrow 11A by the driving operation performed by the actuator 11. The arm member 3 and the arm members 4 to 7 supported by the arm member 3 can be turned in the directions shown by the arrow 12A by the driving operation performed by the actuator 12. The arm member 4 and the arm members 5 to 7 supported by the arm member 4 can be turned in the directions shown by the arrow 13A by the driving operation performed by the actuator 13. The arm member 5 and the arm members 6 and 7 supported by the arm member 5 can be turned in the directions shown by the arrow 14A by the driving operation performed by the actuator 14. The arm member 6 and the arm member 7 supported by the arm member 6 can be turned in the directions shown by the arrow 15A by the driving operation performed by the actuator 15. The arm member 7 is turned in the directions shown by the arrow 16A by the driving operation performed by the actuator 16.

The flange portion 8 can be turned in the directions shown by the arrow 17A by the driving operation performed by the actuator 17. The rotation axes of the actuators 11 to 17 that are adjacent to each other extend perpendicular to each other.

The flange portion 8 is provided with a jig (not shown), and various types of end effectors can be detachably attached to the flange portion 8 with the jig.

The robot 9 (controller 20) performs various operations, such as a fitting operation, a force-following operation, and a pressing operation, by controlling the movements of the actuators 11 to 17 and the end effectors (not shown) that are attached to the flange portion 8. Detailed explanations of force control performed in the above-described operations will be omitted here.

The actuators 11 to 17 are provided with hollow holes at the central sections of the actuators 11 to 17 around the rotation axes corresponding to the turning directions 11A to 17A, respectively. A harness 19 in which wires connected to the actuators 11 to 17 and the end effectors are bound together extends through the hollow holes. The harness 19 extends from the base 1 to the outside of the robot 9, and is connected to the controller 20 and a power supply (not shown).

Figure 1:
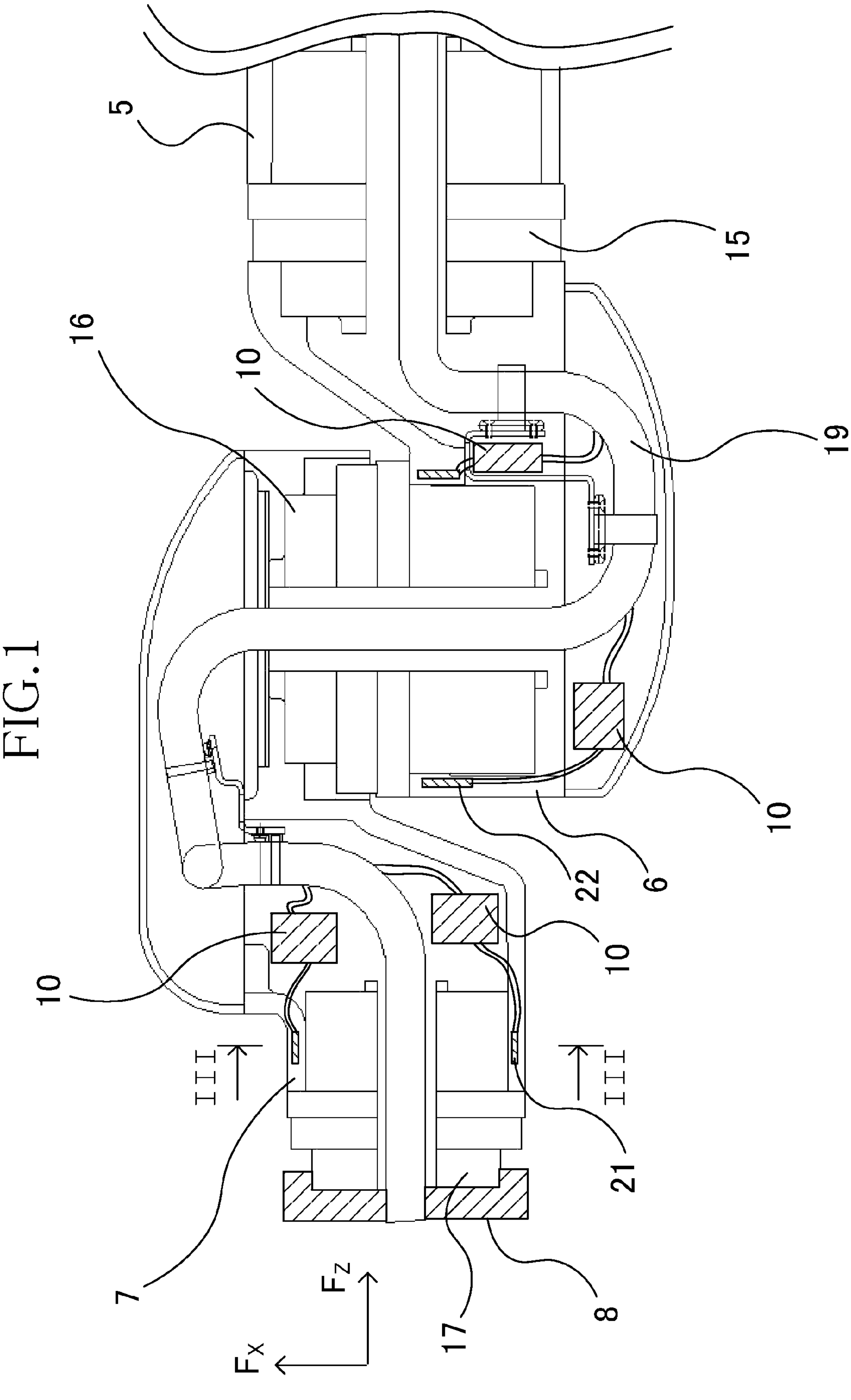
FIG. 1 is a diagram illustrating the detailed structure of a distal end section of a robot.

As illustrated in FIG. 1, sensors (load sensors) 21 and 22 are respectively embedded in the arm member 7 provided at the distal end of the robot 9 and the arm member 6 that supports the arm member 7.

The sensors 21 and 22 are strain sensors capable of measuring the amount of strain, and are configured to measure the amounts of distortion of the arm members 6 and 7.

Figure 3:
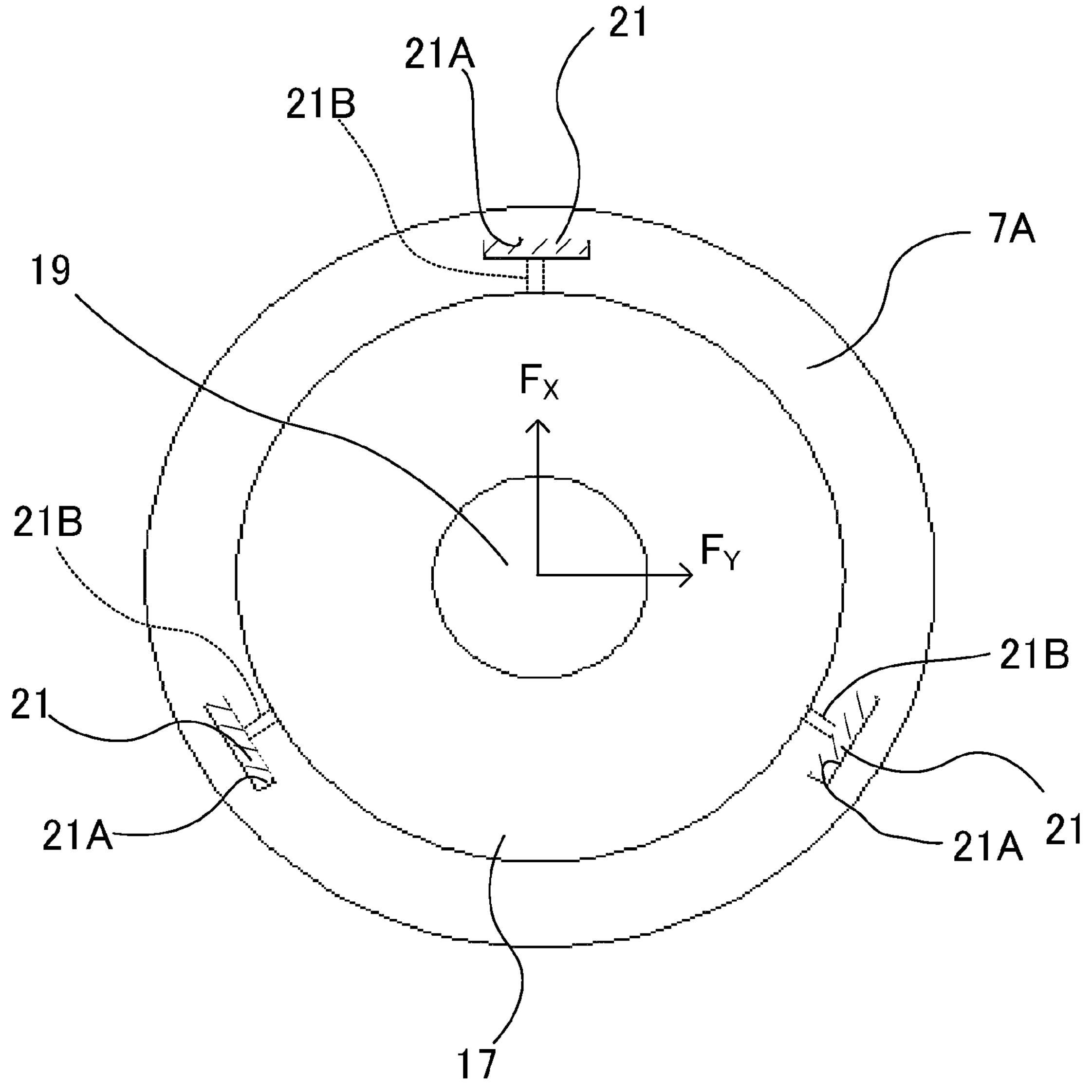
FIG. 3 is a sectional view of FIG. 1 taken along line III-III.

More specifically, as illustrated in FIG. 3, the sensors 21 are disposed in sensor-receiving holes 21A provided in a cylindrical portion 7A of the arm member 7. The cylindrical portion 7A has a cylindrical shape and is arranged to support the actuator 17. Three sensors 21 are disposed at three positions in the cross section of the cylindrical portion 7A such that the sensors 21 are arranged along the circumferential direction (along the circumference centered on the rotation axis of the actuator 17) with constant intervals therebetween.

The controller 20 calculates forces Fx, Fy, and Fz in the respective directions (Fx, Fy, and Fz are orthogonal to each other) on the basis of the amounts of deformation at the three positions measured by the three sensors 21.

Although no sectional view is shown, the sensors 22 are disposed in three sensor-receiving holes, which are provided in a cylindrical portion of the arm member 6 that supports the actuator 16. Three sensors 22 are disposed at three positions along the circumferential direction with constant intervals therebetween.

The sensor-receiving holes 21A, in which the sensors 21 are disposed, communicate with wire holes 21B for receiving wires at the side of the sensor-receiving holes 21A closer to the proximal end of the robot 9. Wires (hereinafter referred to as sensor lines) extend from the sensors 21 to spaces inside the arm member 7 at positions closer to the proximal end of the robot 9 than the actuator 17.

In addition, amplifiers 10 that correspond to the sensor lines and that amplify signals supplied from the corresponding sensor lines are disposed in the spaces inside the arm member 7 at positions closer to the proximal end of the robot 9 than the actuator 17. Wires that extend from the amplifiers 10 are connected to the harness 19.

Similarly, the sensor-receiving holes in which the sensors 22 are disposed communicate with wire holes for receiving wires at the side of the sensor-receiving holes closer to the proximal end of the robot 9, and sensor lines extend from the sensors 22 to spaces inside the arm member 6 at positions closer to the proximal end of the robot 9 than the actuator 16. In addition, amplifiers 10 that amplify signals supplied from the corresponding sensor lines are disposed in the spaces inside the arm member 6, and wires that extend from the amplifiers 10 are connected to the harness 19.

The robot according to the present embodiment is structured as described above. Therefore, the amounts of deflection (strain) generated in the arm member 7 at the cylindrical portion 7A that supports the actuator 17 can be measured by the three sensors 21 arranged along the periphery of the actuator 17 with constant intervals therebetween, and the forces supported by the arm member 7 can be accurately detected on the basis of the measured amounts of deflection (strain).

In addition, the sensor lines extend from the sensors 21 through the wire holes 21B formed in the arm member 7 to the spaces closer to the proximal end of the robot 9 than the actuator 17. Since the sensor lines are supported by the arm member 7, even when the robot 9 is moved, excessive deformation can be suppressed and external forces can be reliably detected.

Although an embodiment is described above, the robot according to the present invention is not limited to the above-described embodiment and various modifications are possible within the scope of the present invention.

For example, in the above-described embodiment, three load sensors are arranged with constant intervals therebetween along the circumference centered on the rotation axis of the corresponding actuator. However, the number and arrangement of the sensors are not limited to those described in the embodiment.

In addition, in the above-described embodiment, the load sensors are attached to two of the arm members that are positioned near the distal end of the robot 9. However, the structure may also be such that load sensors are attached to only one of the arm members. Alternatively, the load sensors may be attached to all of the arm members (including the base).

It is as the case may be desirable as load sensors with an acceleration sensor of a crystal piezo-electric method. Because the sensor is buried, the response speed can be improved further.

What is claimed is:

1. A robot comprising:

a first arm member including a sensor hole, an internal space, and a wire hole, the internal space being defined inside the first arm member, the wire hole connecting the sensor hole to the internal space;

a second arm member connected to the first arm member to be relatively rotatable with respect to the first arm member;

an actuator configured to relatively rotate the first arm member with respect to the second arm member;

a load sensor embedded in the first arm member to measure load applied to the first arm member and provided in the sensor hole to be embedded in the first arm member;

a controller configured to control the actuator on the basis of the load measured by the load sensor; and a sensor line connecting the load sensor to the controller and extending from the load sensor through the wire hole to the internal space.

2. The robot according to claim 1, further comprising:

an amplifier configured to amplify a signal output from the load sensor, the amplifier being disposed in the internal space defined inside the first arm member, the sensor line connecting the load sensor to the amplifier and connecting the amplifier to the controller.

3. The robot according to claim 1, wherein the first arm member includes a cylindrical portion which has a tubular shape, the actuator being fixed to the cylindrical portion, and wherein the load sensor is embedded in the cylindrical portion, the sensor hole being provided in the cylindrical portion.

4. The robot according to claim 3, wherein the sensor hole comprises a plurality of the sensor holes, and wherein the load sensor comprises a plurality of the load sensors respectively provided in the sensor holes to be embedded in the first arm member, the load sensors being arranged with constant intervals therebetween along a circumferential direction of a circular cross section of the cylindrical portion.

5. The robot according to claim 3, wherein the wire hole leads the sensor line to the internal space closer to the controller than the actuator supported by the cylindrical portion.

6. The robot according to claim 1, wherein the load sensor is configured to detect a strain caused by deformation of the first arm member.

7. The robot according to claim 1, wherein the actuator connects the first arm member to the second arm member to be relatively rotatable with respect to the second arm member about a rotational axis.

8. The robot according to claim 7, further comprising:

a harness connecting the sensor line to the controller, wherein the actuator includes a through-hole extending along the rotational axis, wherein the second arm member includes an internal space defined inside the second arm member, and wherein the harness extends from the internal space of the second arm member through the through-hole of the actuator to the internal space of the first arm member.

9. The robot according to claim 1, wherein the first arm member includes an outer wall, and wherein the load sensor is embedded in the outer wall.

10. The robot according to claim 9, wherein the sensor hole and the wire hole are provided in the outer wall.

11. A robot comprising:

a first arm member including a sensor hole and an internal space, the internal space being defined inside the first arm member;

a second arm member connected to the first arm member to be relatively rotatable with respect to the first arm member;

an actuator configured to relatively rotate the first arm member with respect to the second arm member;

load measurement means for measuring load applied to the first arm member and embedded in the first arm member, the load measurement means being provided in the sensor hole to be embedded in the first arm member;

control means for controlling the actuator on the basis of the load measured by the load measurement means; and means for allowing a sensor line to extend from the sensor hole to the internal space, the sensor line connecting the load measurement means to the control means.

12. The robot according to claim 11, further comprising:

an amplifier means for amplifying a signal output from the load measurement means, the amplifier means being disposed in the internal space defined inside the first arm member, the sensor line connecting the load measurement means to the amplifier means and connecting the amplifier means to the control means.

13. The robot according to claim 11, wherein the first arm member includes a cylindrical portion which has a tubular shape, the actuator being fixed to the cylindrical portion, and wherein the load measurement means is embedded in the cylindrical portion, the sensor hole being provided in the cylindrical portion.

14. The robot according to claim 11, wherein the load measurement means is for detecting a strain caused by deformation of the first arm member.

15. The robot according to claim 11, wherein the actuator connects the first arm member to the second arm member to be relatively rotatable with respect to the second arm member about a rotational axis.

16. The robot according to claim 15, further comprising:

a harness connecting the sensor line to the control means, wherein the actuator includes a through-hole extending along the rotational axis, wherein the second arm member includes an internal space defined inside the second arm member, and wherein the harness extends from the internal space of the second arm member through the through-hole of the actuator to the internal space of the first arm member.

17. The robot according to claim 11, wherein the first arm member includes an outer wall, and wherein the load sensor is embedded in the outer wall.

18. The robot according to claim 17, wherein the sensor hole and the wire hole are provided in the outer wall.

* * * * *